(No Model.)

F. L. FRENCH.
ADJUSTABLE AXLE NUT.

No. 313,311. Patented Mar. 3, 1885.

Witnesses:
W. B. Masson
Franklin H. Hough

Inventor:
Frank L. French
per H. W. Cragin, Atty.

UNITED STATES PATENT OFFICE.

FRANK L. FRENCH, OF MERIDEN, NEW HAMPSHIRE.

ADJUSTABLE AXLE-NUT.

SPECIFICATION forming part of Letters Patent No. 313,311, dated March 3, 1885.

Application filed November 26, 1884. (No model.)

*To all whom it may concern:*

Be it known that I, FRANK L. FRENCH, a citizen of the United States, residing at Meriden, in the county of Sullivan and State of New Hampshire, have invented certain new and useful Improvements in a Compound Adjustable Axle-Nut; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide in one compact device an axle-nipple nut, an adjustable washer, and a washer-adjusting nut.

To this end my invention consists, mainly, in a cylindrical washer of chemical bronze or any suitable material, adjustable to or from the end of the axle-box, said washer moving on the external cylindrical portion of the nipple-nut by means of an outside adjusting-nut, the washer and the latter nut being properly screw-threaded for this purpose, the washer being held from being turned by the friction of the axle-box or the adjusting-nut by means of a lock-pin inserted in matched grooves—one on the outside of the cylindrical portion of the nipple-nut, the other on the inside of the washer.

My invention also consists in the combination of the parts composing the compound nut, as will be described below and pointed out in the claims.

Figure 1:
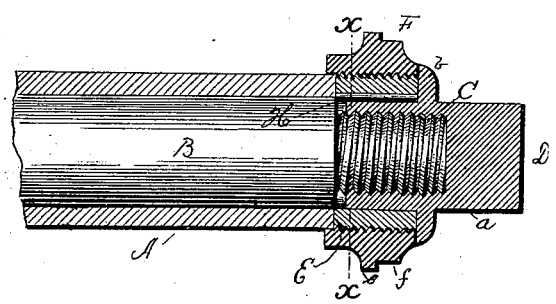
Figure 2:
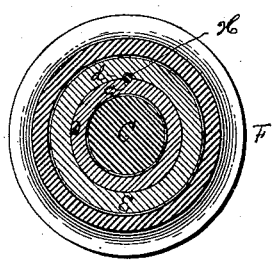
Figure 3:
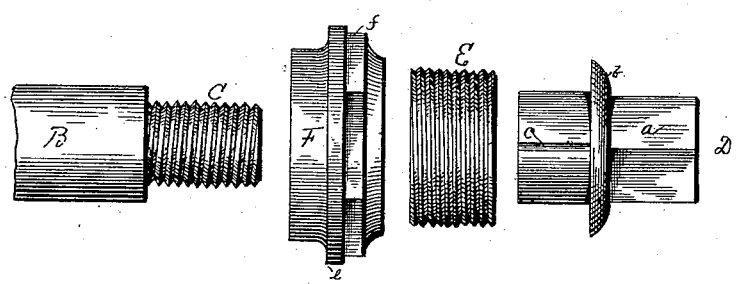

In the drawings, Figure 1 is a vertical section showing the device applied in connection with an axle box and nipple. Fig. 2 is an end view of the compound nut. Fig. 3 is a detail view of the parts composing it.

Like letters refer to like parts.

The usual axle-box, axle, and axle-nipple are represented by the letters A, B, and C. The nipple-nut D has the ordinary square head and raised ring or shoulder, $a$ and $b$. The screw-thread of this nut is left-hand, and it will be readily seen how it engages with the corresponding thread on the axle-nipple. The external portion of the nut forward of the shoulder $b$ is cylindrical and without screw-threads; but it has a longitudinal groove, $c$, for reasons given below. The washer E rests and moves upon the said cylindrical portion of nut D, and consists of an open metallic cylinder or sleeve externally screw-threaded, and having internally a groove, $d$, to match with groove $c$ when the washer and nipple-nut are properly arranged. I prefer to make this washer of chemical bronze, as I find this material has advantages in connection with the wear caused by the axle-box, or for keeping out dirt and preventing the escape of axle-lubricants; but any suitable material may be employed. The washer may be practically as long as the space between the shoulder $b$ and the inner end of nut D; or it may be somewhat shorter, to give more play forward or back.

To adjust the washer after the nut D is screwed on, a nut F is employed. This has the usual external ring, $e$, and hexagonal wrench-head $f$. Inside there is a right-hand screw-thread, which engages with the corresponding thread upon the washer. In order to prevent the washer from being turned upon the cylindrical portion of nut D by the friction of the axle-box or the adjusting-nut F, a lock-pin, H, is inserted in the opening formed by the matched grooves $c$ and $d$; hence the only motion transmitted to the washer by the nut F is longitudinal, forward, or back, said motion being limited by the length of the washer. In order to better keep all the parts together when the whole nut is removed from the axle, it may be preferable to swivel the nut F to the nut D by extending a swivel-band over and down the shoulder $b$.

The operation of the compound nut is simply this: First screw on the nipple-nut to the left, and then turn the adjusting-nut in the same direction, which will cause the washer to move forward against the end of the axle-box. As wear takes place and the hub shakes or rattles, it is only necessary to move the washer farther forward by the adjusting-nut. If it is desirable to give the hub more lateral play, move the washer back by a reverse turning of said nut.

My device is simple, effective, and compact, and it is a decided advantage to adjust the washer against the axle-box by turning the adjusting-nut in the same direction as the nipple-nut.

Having fully described my invention, what I claim, and desire to secure by Letters Patent, is—

1. In a hub-attaching device, the combination, with the tubular portion of the axle-nipple nut, having its periphery without screw-threads, of a cylindrical washer without internal screw-threads, and adapted to lock with the tubular portion of the axle-nipple nut, so as to have a longitudinal movement only thereon, and the external nut adapted to adjust the washer by engaging with the screw-threads on its periphery, as set forth.

2. In a hub-attaching device, the combination, with the tubular portion of the axle-nipple nut, having its periphery without screw-threads, of a cylindrical washer of chemical bronze without internal screw-threads, and adapted to lock with the said tubular portion of the axle-nipple nut, so as to slide thereon without turning, and the external nut adapted to adjust the washer by engaging with the screw-threads on its periphery, as set forth.

3. As a hub-attaching device, the compound adjustable nut composed of the tubular nipple-nut D, having groove c, the lock-pin H, the adjustable externally-threaded washer E, having groove d, and the outside adjusting-nut, F, as set forth.

4. As a hub-attaching device, the compound adjustable nut composed of the nipple-nut D, having a left-hand thread, and an external groove, c, the cylindrical washer E, having an external screw-thread and the internal groove, d, the lock-pin H, and the adjusting-nut F, having a right-hand screw-thread, all combined as set forth.

5. The combination of the nipple-nut D with the axle-nipple C, the lock-pin H, the adjustable washer E, the adjusting-nut F, and the axle-box A, as set forth.

In testimony whereof I affix my signature in presence of two witnesses.

FRANK L. FRENCH.

Witnesses:
J. E. DEWEY,
O. T. BRIGGS.